May 8, 1934.  W. A. RIDDELL  1,957,911
CABLE RELEASE FOR PHOTOGRAPHIC SHUTTERS
Filed April 7, 1933
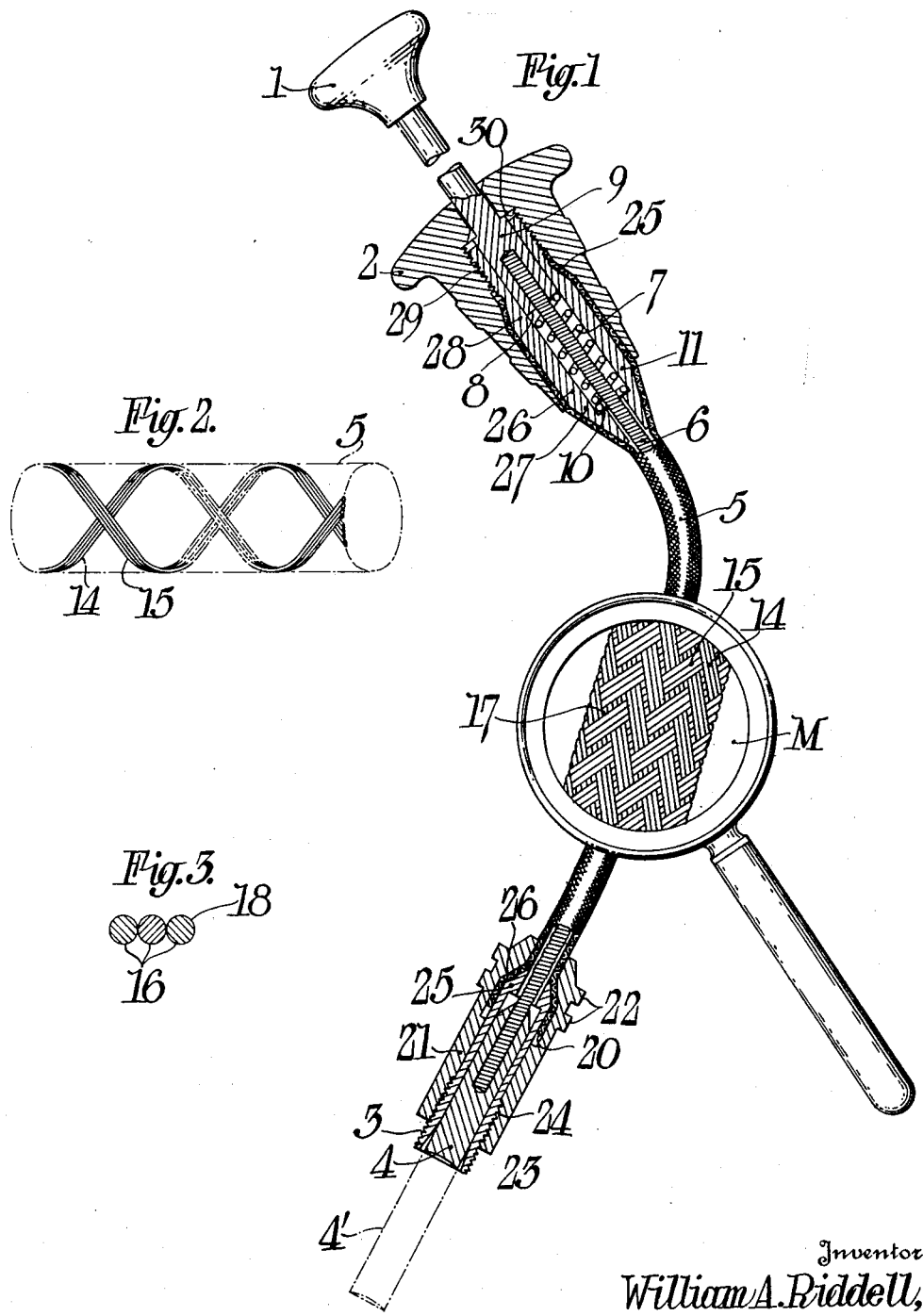
Inventor:
William A. Riddell,
By
Attorneys Patented May 8, 1934

1,957,911

UNITED STATES PATENT OFFICE 1,957,911

CABLE RELEASE FOR PHOTOGRAPHIC SHUTTERS

William A. Riddell, Rochester, N. Y., assignor to Eastman Kodak Company, Rochester, N. Y., a corporation of New York Application April 7, 1933, Serial No. 664,925

6 Claims. (Cl. 74—39)

This invention relates to flexible releases for photographic shutters and particularly to releases generally known to the trade as cable releases. One object of my invention is to provide an all-metal flexible release by which power may be transmitted from finger pieces to a shutter trigger for operating the trigger. Another object of my invention is to provide a flexible release which will stand considerable wear because of its construction. Another object of my invention is to provide a cable release having a flexible portion which is attractive to the eye in that it may be readily made of polished metal. Another object of my invention is to provide a cable release with a single flexible inextensible outer case and a single flexible incompressible inner member, the two members being adapted to slide freely with respect to each other. Another object of my invention is to provide a cable release with a woven wire outer casing in which the strands are angularly disposed with respect to the convolutions of a wire helix which forms the inner or thrust member so that the thrust member may slide freely in the casing member. Another object of my invention is to provide a cable release with a woven wire metallic casing which is the sole outer casing and which can, therefore, be made of comparatively small diameter. Still another object of my invention is to provide a cable release in which the ends of the outer covering can be securely fastened into ferrules without the use of solder or adhesives and other objects will appear from the following specification, the novel features being particularly pointed out in the claims at the end thereof.

Coming now to the drawing wherein like reference characters denote like parts throughout:

Fig. 1 is a part perspective and part sectional view of a cable release constructed in accordance with and embodying a preferred form of my invention, a small section of the cable release being shown as it would appear through a magnifying glass;

Fig. 2 is a perspective diagrammatical view illustrating the direction of the strands which are interwoven to form the outer casing of my cable release; and Fig. 3 is a section through one of the strands which may be used in weaving the wire release casing.

This cable release is an improvement over the cable release shown in U. S. Patent No. 1,297,327, Dakin and Underwood, March 18, 1919. In some respects the present release is similar to the release shown in this patent and differs primarily in the construction of the outer casing.

As indicated in Fig. 1 a cable release may comprise a pair of operating handles 1 and 2 which are connected to the shutter ferrules 3 and 4 by means of a flexible outer casing 5 which is inextensible in length and a flexible inner cable 6 which is incompressible in length. The cable 6 is adapted to slide in the tubular casing 5 and a spring 7 pressing on the shoulder 8 of the rod 9 which supports the handle 1 and pressing on the shoulder 10 of the ferrule 11 normally thrusts the operating handles 1 and 2 from each other into a normal position, as indicated in Fig. 1.

In this position the plunger 4 lies inside of the ferrule 3. When, however, the operating handles 1 and 2 are pressed together the plunger 4 moves into the position shown in broken lines at 4′ and actuates a photographic shutter in a well known manner.

The construction of the cable 5 is of considerable importance. Normally in cable releases for photographic shutters a spring or coil of wire supports a fabric covering as shown in the above mentioned patent. This has certain disadvantages notably that the cover, when of fabric, may chafe on parts of the camera and become worn and when this occurs the wire support for the covering is liable to break through and spoil the release. Moreover, when a coil spring is used to support the covering the convolutions of the spring may be somewhere near parallel to the convolutions of the thrust member coil and if the cable release is sharply bent the two convolutions can readily strike each other and prevent successful operation of the release.

With my improved cable release an all-metal woven wire tubular member is provided. The wires of this member form both the inner and outer walls of the tubular member and since they are arranged spirally at quite an acute angle to the convolutions of the thrust member 6, it is almost impossible to bend the cable 5 in such a manner that any one wire will project into the path of the thrust member 6.

It is somewhat difficult to adequately show the member 5 in the limitations imposed in a Patent Office drawing since the member 5 is woven from a multitude of small wires.

As best shown through the magnifying glass m the cable 5 consists of a series of wire strands 14 and 15 running at an angle to each other, being woven in and out very much like cloth. As illustrated in the diagram in Fig. 2 the strands 14 and 15 individually pass in spirals so that when a sufficient number of these strands are woven together a tubular member 5 will result. I prefer to form each of the strands 14 and 15 of a plurality of separate wires. Thus as illustrated in Fig. 3 in a much enlarged cross section each strand may comprise a series of wires 16 laid flat side by side.

With a cable woven from strands as above described the cable cannot be stretched to any substantial degree, that is, it may be said to be substantially inextensible. However, such a cable can be easily bent at comparatively sharp angles without opening up the interstices 17 which exist between the various strands of the cable.

It should also be noted that a woven metallic cable of this type provides an excellent slideway for the plunger 6 because the individual wires 16 from which the strands 14 and 15 are made up have a smooth outside surface 18 which is comparatively slippery and which will provide an idle guideway and slideway for the thrust member 6.

While the ends of a metallic cable woven from a plurality of strands of wire could readily be soldered to the finger operating handles and to the shutter ferrules, I prefer to fasten the ends of the release mechanically. The end 20 of the cable 5 may be attached to the shutter ferrules in the following manner: An annular sleeve member 21 may be provided with knurled areas 22 for screwing the threaded area 23 into a shutter.

The threaded area 23 also engages a thread 24 on the ferrule 21 so that the tapered annular walls 25 and 26 on the sleeves 21 and 23 may be brought together. By slightly flaring out the end of a woven wire cable and placing it over the annular tapered wall 25, after the sleeve 21 has first been slid over the end of the cable and by turning the sleeves 21 and 23 until the tapered walls approach each other the end 20 of the cable 5 can be securely fastened in place.

A somewhat similar fastening may be used to attach the opposite end 25 of the cable 5 to the operating handle 2. In this case an annular plug 26 having tapered walls 27 and 28 is thrust into the end of the cable. The plug 26 is provided with a thread 29 meshing with the thread 30 in the inner bore of the operating handle 2. By screwing these parts tightly together the end 25 of the cable is securely clinched between these relatively movable parts.

Thus it is a simple matter to securely attach both ends of the woven wire cable 5 to the operating parts, that is, to the operating handle 2 at one end and to the shutter ferrule 21 at the other end.

A cable release constructed in accordance with my invention not only has an extremely durable one-piece outer casing 5 which will not become chafed and worn through contact with metallic parts of a camera body but it also has a peculiarly attractive finish. For instance, for tan or colored cameras polished bronze or brass wires 16 may be used to form the strands 14 and 15. This type of cable is quite attractive in appearance. It is also possible to use any finish on the metallic wires which is desired, chromium plated wires making an extremely brilliant release.

In the specification and claims where I refer to the cable 5 as being substantially inextensible, I mean that it can be stretched only to such a slight degree that it does not affect the operation of the release and that the stroke of the operating handles 1 and 2 is sufficient to operate the shutter when the release is extended a maximum amount.

In making a release of this type the cable 5 is stretched before the release is made so that any slight extension which may occur due to the strands being loosely woven is taken up before the cable is fastened into the release.

The cable 6 may be any of the well known construction and is preferably a closely coiled wire helix as shown in the Dakin and Underwood patent. Such a cable has the advantage of being incompressible, of being very flexible and of being inexpensive to construct. The cable 6 may be fastened into the shutter operating plunger 4 and into the end of the rod 9 which carries the operating handle 1 in any desired manner, such as by the use of a prick punch, by solder or any well known method may be used to attach these parts.

Not only does a cable release constructed in accordance with my invention have the advantages of unusual durability and good looks but the release can be readily assembled by comparatively unskilled help, the parts all being of quite rugged construction when the size of these parts is taken into consideration.

While I have shown a preferred cable construction in the drawing and have illustrated the cable 5 as being woven from a series of wire strands each made up from a plurality of wires, I do not wish this application to be limited to the particular weave shown nor to any number of wires for forming each individual strand because it is possible to weave a wire casing with the individual strands consisting of single wires. However, I have found that by making the strands of a plurality of wires the release is somewhat more flexible than where only single wires are used for each strand. This is due to the fact that where each individual wire passes over and under the next wire to it that there is less play and room for relative movement between the strands and consequently the release is less flexible.

For some purposes where the flexibility of the release need not be so great it might be preferable to weave a wire cable with the strands made of individual wires.

While I have illustrated an embodiment of my invention in which the woven wire tube happens to consist of wires so woven that the strands pass over two strands and then under two strands, it is to be understood that this embodiment is by way of illustration only and that other types of weaves may be employed.

Necessarily, the amount of flexibility of the woven tube 5 depends upon the amount of flexibility and the actual diameter of the various individual wires of which the tube is woven. The material of which the wires are made also affects the flexibility of the tube into which they are woven. I contemplate as within the scope of my invention any woven wire tube which is substantially inextensible in length as called for in the appended claims.

What I claim as new and desire to secure by Letters Patent of the United States is:

1. In a cable release for photographic cameras the combination with a flexible outer casing member consisting of a woven strand wire tube substantially inextensible in length, of an inner thrust member of substantially incompressible construction, operating handles on one end of each member for moving one member relative to the other, and shutter operating ferrules on the other end of each member, whereby power may be transmitted through the flexible tube and thrust member to actuate a shutter.

2. In a cable release for photographic shutters, the combination with a flexible tubular member, of an inner flexible thrust member, said tubular member consisting of interwoven spirally arranged wires substantially inextensible in length, said thrust member including an incompressible flexible wire adapted to slide in said tubular member, operating handles on one end of each member, shutter actuating ferrules on the other end of each member and a spring normally holding the members in a fixed position.

3. In a cable release for photographic shutters, the combination with a flexible tubular member, of an inner flexible thrust member, said tubular member consisting of a woven wire self-supporting foraminous tubular member substantially inextensible in length, operating handles on one end of each member, shutter actuating ferrules on the other end of each member and a spring normally holding the members in a fixed position.

4. In a cable release for photographic shutters, the combination with a flexible tubular member, of an inner flexible thrust member, said tubular member consisting of spirally arranged wires woven together and crossing and recrossing each other forming a self-sustaining tubular support practically inextensible throughout its length, operating handles on one end of each member, shutter actuating ferrules on the other end of each member and a spring normally holding the members in a fixed position.

5. In a cable release for photographic shutters, the combination with a flexible tubular member, of an inner flexible thrust member, said tubular member consisting of right and left hand spirally arranged intercrossing strands woven together and substantially inextensible in length, operating handles on one end of each member, shutter actuating ferrules on the other end of each member and a spring normally holding the members in a fixed position.

6. In a cable release for photographic shutters, the combination with a flexible tubular member, of an inner flexible thrust member, said tubular member consisting of right and left hand spirally arranged intercrossing strands, each strand comprising a plurality of individual wires laid side by side, operating handles on one end of each member, shutter actuating ferrules on the other end of each member and a spring normally holding the members in a fixed position.

WILLIAM A. RIDDELL.